(12) United States Patent
Matsunaga et al.

(10) Patent No.: US 8,408,596 B2
(45) Date of Patent: Apr. 2, 2013

(54) AIR BAG DEVICE FOR PASSENGER SEAT

(75) Inventors: Takashi Matsunaga, Yokohama (JP); Takeshi Ohwada, Yokohama (JP)

(73) Assignee: Autoliv Development AB, Vargarda (SE)

( * ) Notice: Subject to any disclaimer, the term of this patent is extended or adjusted under 35 U.S.C. 154(b) by 206 days.

(21) Appl. No.: 12/743,461

(22) PCT Filed: Aug. 21, 2008

(86) PCT No.: PCT/JP2008/002267
§ 371 (c)(1), (2), (4) Date: May 18, 2010

(87) PCT Pub. No.: WO2009/066404
PCT Pub. Date: May 28, 2009

(65) Prior Publication Data
US 2010/0320737 A1  Dec. 23, 2010

(30) Foreign Application Priority Data
Nov. 22, 2007 (JP) .................................. 2007-303646

(51) Int. Cl.
*B60R 21/201* (2011.01)
(52) U.S. Cl. ..................................... 280/743.1; 280/732
(58) Field of Classification Search ............... 280/743.1, 280/732, 733, 742, 743.2
See application file for complete search history.

(56) References Cited

U.S. PATENT DOCUMENTS

| | | | |
|---|---|---|---|
| 5,730,463 A * | 3/1998 | Fisher et al. ............... | 280/743.1 |
| 6,131,944 A * | 10/2000 | Henkel et al. .............. | 280/728.3 |
| 6,206,409 B1 * | 3/2001 | Kato et al. ................. | 280/728.2 |
| 6,371,510 B1 * | 4/2002 | Marriott et al. ............ | 280/730.1 |
| 6,942,242 B2 * | 9/2005 | Hawthorn et al. .......... | 280/728.2 |

(Continued)

FOREIGN PATENT DOCUMENTS

| | | |
|---|---|---|
| DE | 602004003557 | 10/2007 |
| EP | 1 585 654 | 10/2005 |

(Continued)

OTHER PUBLICATIONS

International Search Report in International Application No. PCT/JP2008/002267, mailed Oct. 7, 2008, 4 pages.

*Primary Examiner* — Paul N Dickson
*Assistant Examiner* — Karen Beck
(74) *Attorney, Agent, or Firm* — Brinks Hofer Gilson & Lione

(57) ABSTRACT

An airbag device that may ensure an increased restraining force and a reduction of damage with respect to an occupant that is out of position or of small stature is provided. The airbag device for a passenger seat of the present invention may be disposed inside an instrument panel of a vehicle and protects an occupant inside the vehicle by inflation and deployment of an airbag when an emergency situation occurs. The airbag device includes: an airbag that is compressed into a plurality of layers in a vertical direction when not used, and inflated and deployed when an emergency situation occurs; and a restriction member that restricts the deployment of the airbag so that a deployment direction of an upper layer portion is directed toward an occupant side, wherein the upper layer portion is deployed first from among the plurality of layers of the airbag.

13 Claims, 11 Drawing Sheets

U.S. PATENT DOCUMENTS

| | | | |
|---|---|---|---|
| 6,988,743 B2 * | 1/2006 | Okamoto et al. | 280/743.1 |
| 7,004,501 B2 * | 2/2006 | Schneider et al. | 280/743.1 |
| 7,021,653 B2 * | 4/2006 | Burdock et al. | 280/730.1 |
| 7,377,547 B2 * | 5/2008 | Schimpff et al. | 280/743.1 |
| 7,404,570 B2 * | 7/2008 | Miyata | 280/728.2 |
| 7,731,230 B2 * | 6/2010 | Fischer et al. | 280/732 |
| 7,845,672 B2 * | 12/2010 | Onohara | 280/728.3 |
| 7,874,586 B2 * | 1/2011 | Budowick | 280/743.1 |
| 7,878,534 B2 * | 2/2011 | Kumagai et al. | 280/732 |
| 2002/0089155 A1 | 7/2002 | Tajima et al. | |
| 2002/0158451 A1 * | 10/2002 | Nusshor | 280/730.2 |
| 2006/0071459 A1 | 4/2006 | Hayakawa et al. | |
| 2009/0152842 A1 * | 6/2009 | Benny et al. | 280/728.3 |
| 2010/0320737 A1 * | 12/2010 | Matsunaga et al. | 280/743.1 |
| 2011/0241317 A1 * | 10/2011 | Lee | 280/729 |

FOREIGN PATENT DOCUMENTS

| | | |
|---|---|---|
| JP | 07-069149 A | 3/1995 |
| JP | 07-205750 A | 8/1995 |
| JP | 2000-289554 A | 10/2000 |
| JP | 2001-030863 A | 2/2001 |
| JP | 2002-187512 A | 7/2002 |
| JP | 2004-224259 A | 8/2004 |
| JP | 2005-075138 A | 3/2005 |
| JP | 2005-186888 A | 7/2005 |
| JP | 2006-151015 A | 6/2006 |
| KR | 2005-0093843 A | 9/2005 |
| WO | WO 2004/065178 A1 | 8/2004 |
| WO | WO 2009/066404 | 5/2009 |

* cited by examiner

Stage 1

Stage 2

Stage 3

Stage 1

Stage 2

Stage 3

AIR BAG DEVICE FOR PASSENGER SEAT

This application is a National Stage of International Application No. PCT/JP2008/002267 filed on Aug. 21, 2008, which claims priority to Japanese Patent Application No. JP 2007-303646 filed with the Japanese Patent Office on Nov. 22, 2007, the entirety of which are hereby incorporated by reference.

BACKGROUND

1. Technical Field

The present invention relates to an airbag device that deploys an airbag and protects an occupant in case of vehicle collision. More particularly, the invention relates to an airbag device that is disposed inside an instrument panel of the vehicle and protects an occupant in a passenger seat.

2. Background Information

An airbag devices that deploy an airbag to protect an occupant in case of vehicle collision are known. The airbag device is typically mounted inside a steering wheel or an instrument panel and protects the driver or an occupant in the passenger seat. In order to ensure the protection of the driver etc., the airbag device may be also mounted on the side portion of a seat back or above a side door.

Such airbag devices typically have a common base structure that includes a retainer case containing a folded airbag or inflator and a sensor that detects the vehicle collision. Specifically, when the vehicle collision is detected by the sensor, an igniting agent located inside the inflator is ignited and a gas-generating agent located inside the inflator is burned. As a result, gas is expelled out from the inflator into the airbag which causes the airbag to be filled with the gas and deployed.

However, the deployment direction of the airbag or the sequence and timing of the deployment directions (referred to below as a "deployment state") affect the restraining ability that is necessary to protect the occupant safely. In order to control such a deployment state of airbags, in conventional airbag devices, for example, the airbag may be folded in a particular manner and a special member that controls the deployment state of the airbag may be provided inside the airbag.

However, with such conventional means, it is difficult to form the cloth from which the airbag is made, thus the manufacturing process is also difficult. Alternatively, the method of folding the airbag may be complex and the airbag deployment state is often difficult to control to produce an optimum result.

Patent Document 1 suggests an airbag device having a structure in which an interference portion that interferes with the airbag deployment and an escape portion into which the airbag subjected to interference can escape are formed outside the airbag. With such a structure, as the airbag deploys, the airbag is released from the interference portion. The deployment state of the airbag can be controlled by adjusting the time from the beginning of the deployment until the airbag is released from the interference portion.

Patent Document 1: Japanese Laid-open Patent Application No. 2001-30863.

However, in the configuration disclosed in Patent Document 1, the reduction in injury value is insufficient for occupants such as a child that is out of position or a woman of small stature. For example, when a child is abnormally close to the instrument panel, the inflated airbag deploys along the windshield, passes above the child's (occupant's) head and cannot demonstrate a sufficient restraining force. Further, when an occupant of small stature (e.g., a woman) is in the passenger seat, the inflated airbag directly contacts the occupant's head and sufficient restraining force cannot be achieved.

BRIEF SUMMARY

The present invention was created with the foregoing in view and it is an object of the invention to provide an airbag device that can ensure an increase in restraining force and a reduction of damage with respect to an occupant that is out of position or of small stature.

In order to attain the above-described object, the present invention provides an airbag device for a passenger seat that is disposed inside an instrument panel of a vehicle and protects an occupant inside the vehicle by inflation and deployment of an airbag when an emergency situation occurs. The airbag device includes an airbag that is compressed into a plurality of layers in a vertical direction when not used, and inflated and deployed when an emergency situation occurs. A restriction member that restricts, from among the plurality of layers of the airbag, the deployment of the airbag so that a deployment direction of an upper layer portion that is the first to be deployed is directed toward the occupant side.

The restriction member can be configured as a first flap, a portion of which is fixed to the vehicle and which encloses part of a lower layer portion that is deployed following the upper layer portion. In this case, the first flap can be configured to have a rearward enclosure region that encloses the occupant side of the lower layer portion of the airbag, and a side surface enclosure portion that extends from between the lower layer portion and the upper layer portion of the airbag in a widthwise direction of the vehicle and covers a side surface of the lower layer portion. It is desirable that a windshield side of the lower layer portion of the airbag is configured so as not to be covered by the first flap. Further, it is preferred that the side surface enclosure portion of the first flap is configured to extend obliquely downward from the occupant side toward the windshield and cover the side surface of the lower layer portion, when the airbag is viewed from a side surface direction of the vehicle.

It is preferred that when the airbag is not used, it is accommodated in a state in which the upper layer portion is wound into a roll-like shape and the lower layer portion is folded in the vertical direction.

The airbag device can further includes a second flap, a portion of which is fixed to the vehicle. The second flap covers at least an upper surface of the airbag in a compressed state. In this case, it is preferred that at the initial stage of actuation of the airbag device, the upper layer portion of the airbag push away the second flap and be freely deployed, and the lower layer portion of the airbag be then deployed from the first flap on the windshield side (front side) of the vehicle.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE DRAWINGS AND THE PRESENTLY PREFERRED EMBODIMENTS

Figure 1:
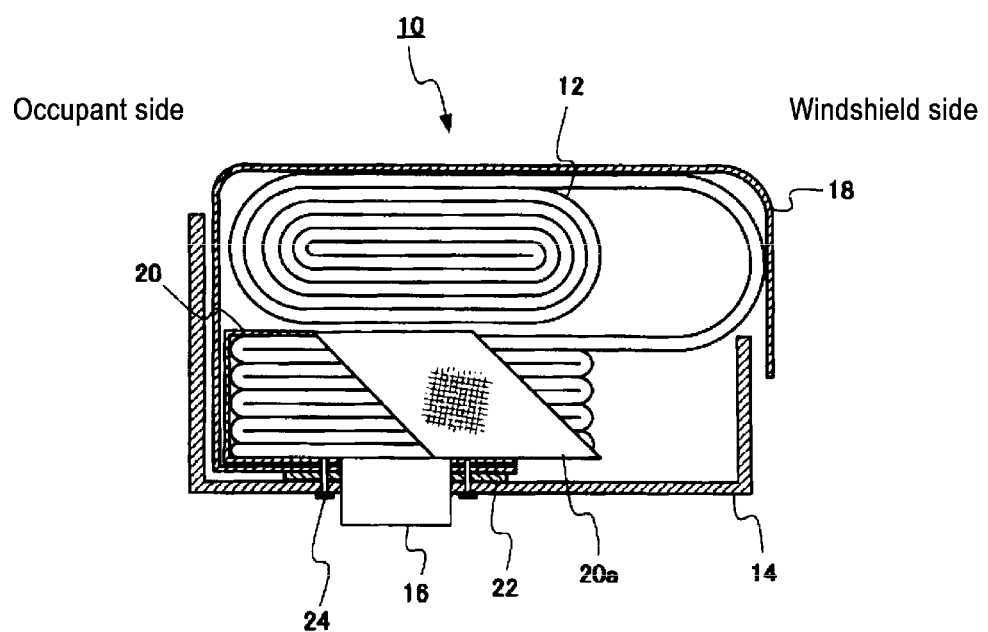
FIG. 1 is a cross-sectional view illustrating the structure of an airbag device in accordance with the present invention.
Figure 2:
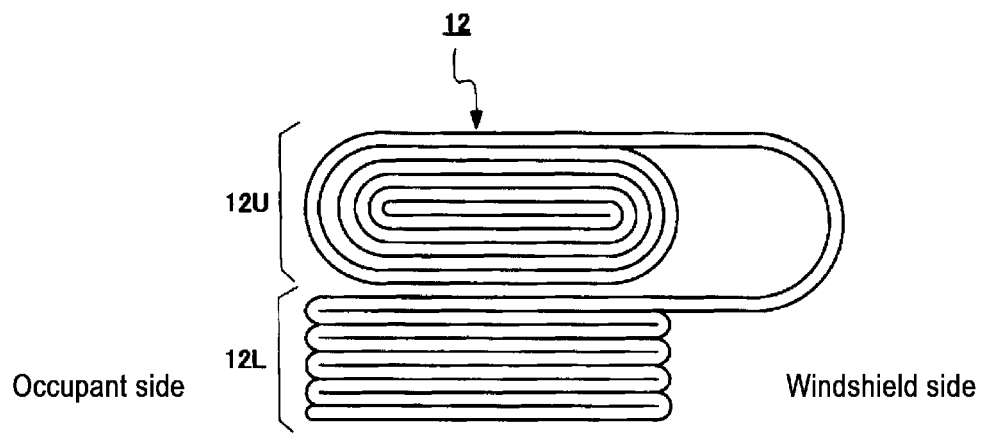
FIG. 2 is a side view illustrating an accommodation state of the airbag (cushion) used in the airbag device in accordance with the present invention.

The present invention will be described below in greater detail on the basis of embodiments thereof. FIG. 1 is a cross-sectional view illustrating the structure of the airbag device in accordance with the present invention. FIG. 2 is a side view illustrating an accommodation state of the airbag (cushion) used in the airbag device in accordance with the present invention.

An airbag device 10 for a passenger seat in accordance with the present invention is disposed in an instrument panel of a vehicle and serves to protect an occupant located inside the vehicle by inflation and deployment of the airbag when an emergency situation occurs. The airbag device includes an airbag 12 that is compressed into a plurality of layers in the vertical direction when not used, and inflated and deployed when an emergency situation occurs, and a restriction member 20 that restricts the deployment of the airbag 12 so that the deployment direction of the upper layer portion 12U that is the first to be deployed, from among the plurality of layers of the airbag 12, is directed toward the occupant.

The airbag 12 is formed into a bag-like shape by using a synthetic fiber cloth or the like, enclosed by an inner flap 20 and an outer flap 18 in a folded state, and accommodated in this state in an airbag container 14 made from a metal foil. The upper portion of the airbag container 14 is open and the airbag 12 (outer flap 18) is exposed.

As shown in FIG. 2, the airbag 12 is compressed into a plurality of layers in the vertical direction and composed of the upper layer portion 12U that is the first to be deployed and a lower level portion 12L located therebelow. The upper layer portion 12U is wound into a roll, and the lower layer portion 12L is folded (folded back on itself) in the vertical direction. The upper layer portion 12U is preferably formed such that, as shown in FIG. 2, a portion (first turn) connected to the lower layer portion 12L protrudes toward the outer shield and wound inward toward the occupant. As a result, the upper layer portion 12U can be initially easily deployed toward the occupant when the airbag 12 is inflated.

A round hole (not shown in the figure) is formed in the bottom of the airbag container 14, and an upper portion (gas discharge port) of an inflator 16 is inserted into the hole. The inflator 16 is fixed to the bottom surface of the airbag container 14 with a flange-like fixing plate 22. The airbag container 14 is fixed to the vehicle.

The inner flap (restriction member) 20 is formed, for example, from the same material as the airbag 12. One end of the inner flap 20 is fixed to the vehicle, with the airbag container 14 being disposed therebetween such that the inner flap 20 partially encloses the lower layer portion 12L of the airbag 12. The outer flap 18 is formed, for example, from the same material as the airbag 12, one end thereof is fixed to the vehicle, with the airbag container 14 being interposed therebetween, and the outer flap is configured to cover at least the occupant side and upper surface of the airbag 12.

Figure 3:
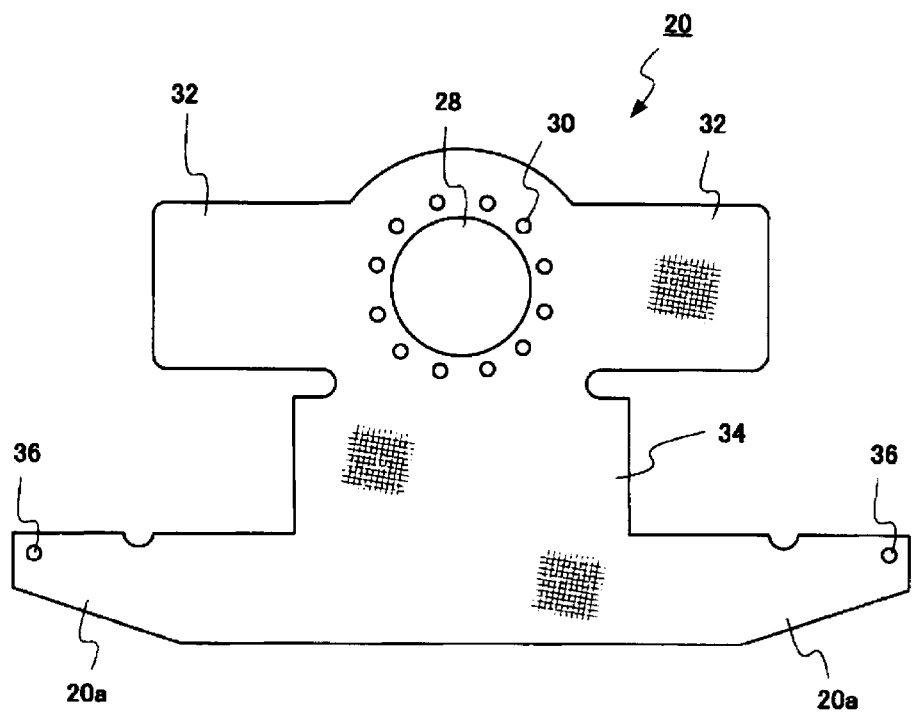
FIG. 3 is an expanded view illustrating the structure of the inner flap that can be used in the airbag device in accordance with the present invention.
Figure 4:
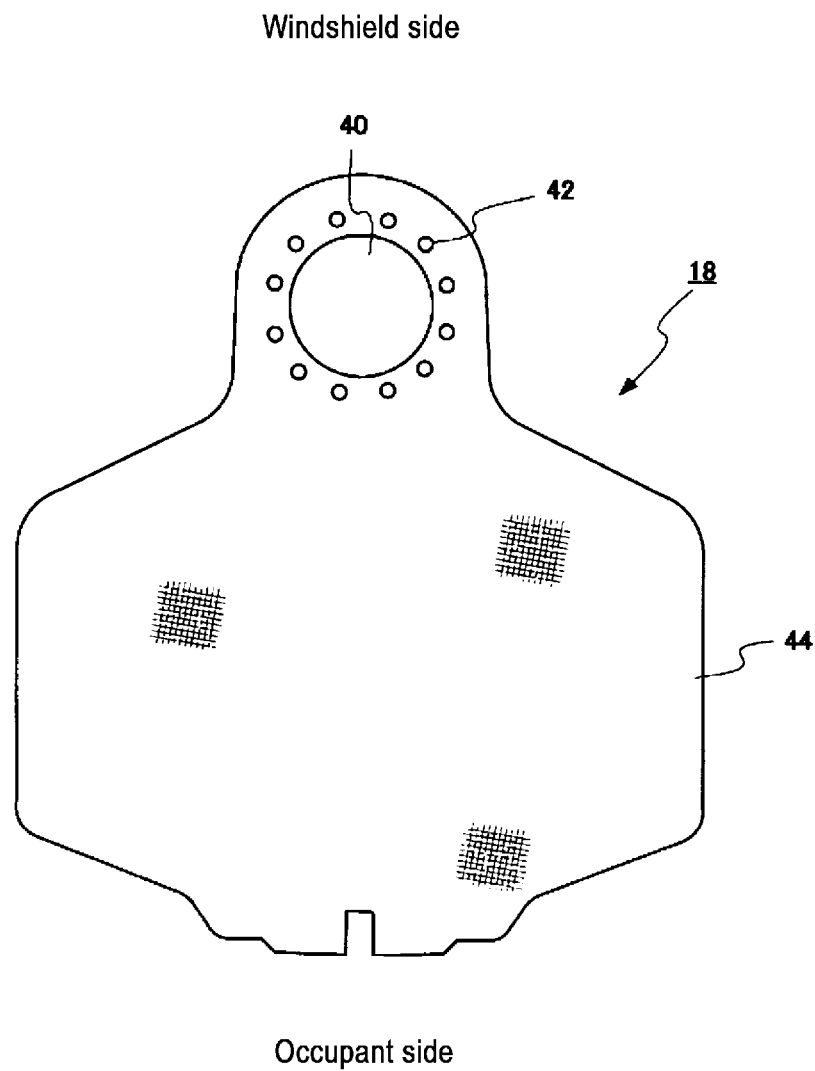
FIG. 4 is an expanded view illustrating the structure of the outer flap that can be used in the airbag device in accordance with the present invention.
Figure 5:
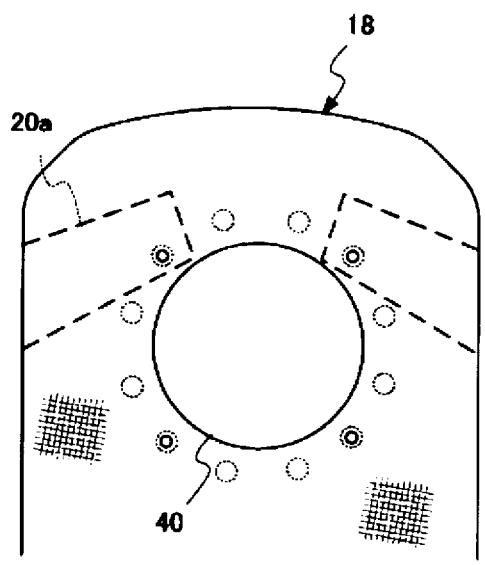
FIG. 5 is a bottom view illustrating the structure of the principal portion of the airbag in accordance with the present invention.

FIG. 3 is an expanded view illustrating the structure of the inner flap 20. FIG. 4 is an expanded view illustrating the structure of the outer flap 18. FIG. 5 shows a bottom surface of the airbag 12 enclosed by the inner flap 20 and the outer flap 18.

As shown in FIG. 3, the inner flap 20 includes a rearward enclosure region 34 that encloses the occupant side of the lower layer portion 12L of the folded airbag 12, a region 312 positioned in the vicinity of the bottom surface of the lower layer portion 12L, and a side surface enclosure portion 20a that extends from between the lower layer portion 12L and the upper layer portion 12U of the airbag 12 in the widthwise direction of the vehicle. The side surface covers the side surface of the lower layer portion 12L. A round hole 28 for inserting the inflator 16 is formed in the inner flap 20, and small holes 30 for fixing bolts 24 are formed equidistantly around the round hole 28. Small holes 36 for fixing with the bolts 24 are also formed in end portions of the side surface enclosure portion 20a so as to overlap with some of the small holes 30.

In accordance with the present invention, the windshield side of the lower layer portion 12L of the airbag 12 is not covered by the inner flap 20. As a result, the lower layer portion 12L of the airbag 12 can be deployed after the upper layer portion 12U. As shown in FIG. 1, when the airbag 12 is viewed from the side surface direction of the vehicle, the side surface enclosure portion 20a of the inner flap 20 extends obliquely downward from the vehicle side toward the windshield side and covers the side surface of the lower layer portion 12L.

As shown in FIG. 1, the outer flap 18 is disposed externally of the inner flap 20. As shown in FIG. 4, the outer flap 18 is provided with a main enclosure portion 44 that encloses the side surface of the airbag 12 on the occupant side and also the upper surface of the airbag 12 from the bottom portion of the airbag container 14. Similarly to the inner flap 20, a round hole 40 for inserting the inflator 16 is formed in the outer flap 18, and small holes 42 for fixing bolts 24 are formed equidistantly around the round hole 40. The outer flap 18 is fixed to the vehicle only in the portion corresponding to the inflator 16.

Figure 6:
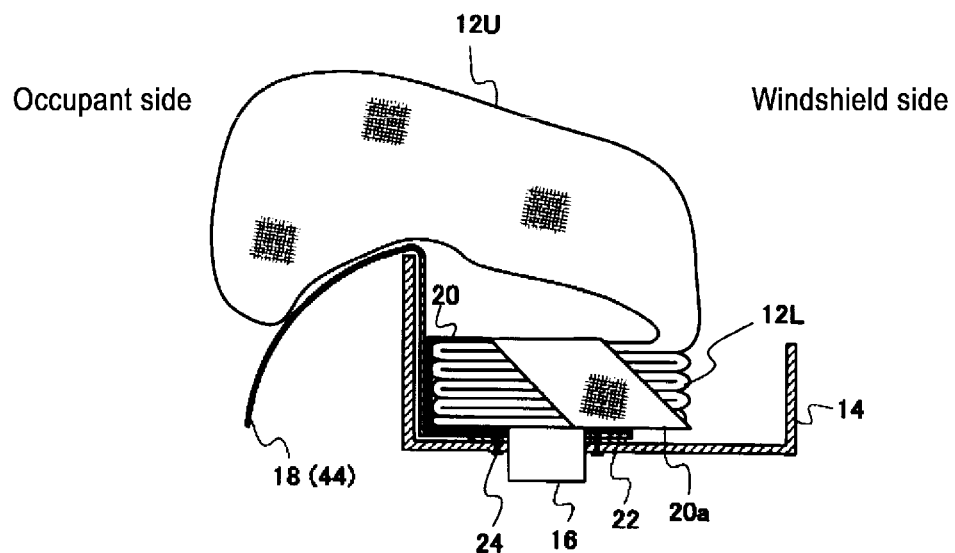
FIG. 6 is an explanatory drawing illustrating the operation of the airbag device in accordance with the present invention and showing the deployment state of the airbag at the initial stage (stage 1).
Figure 7:
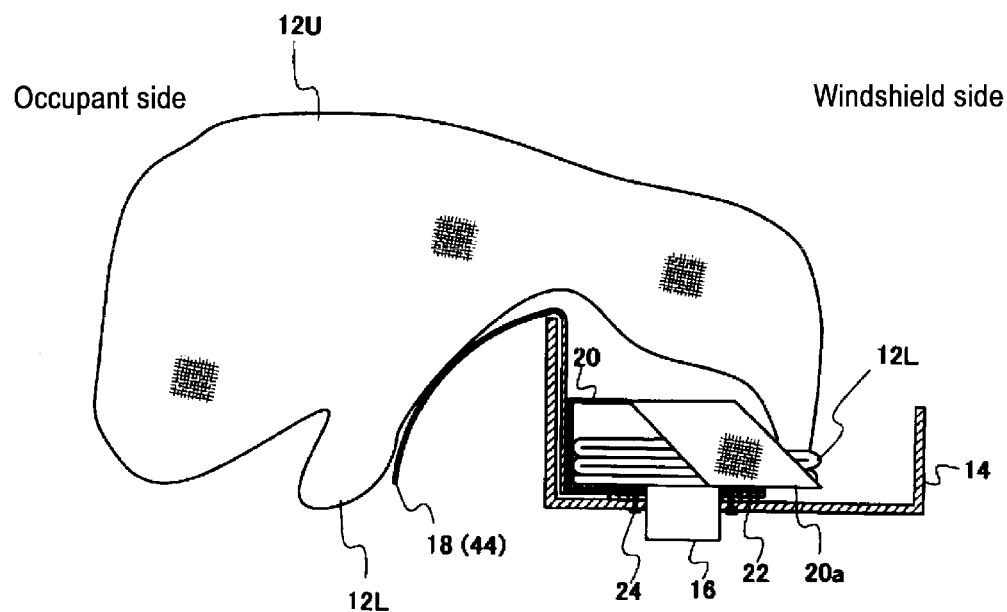
FIG. 7 is an explanatory drawing illustrating the operation of the airbag device in accordance with the present invention and showing the deployment state of the airbag at the intermediate stage (stage 2).
Figure 8:
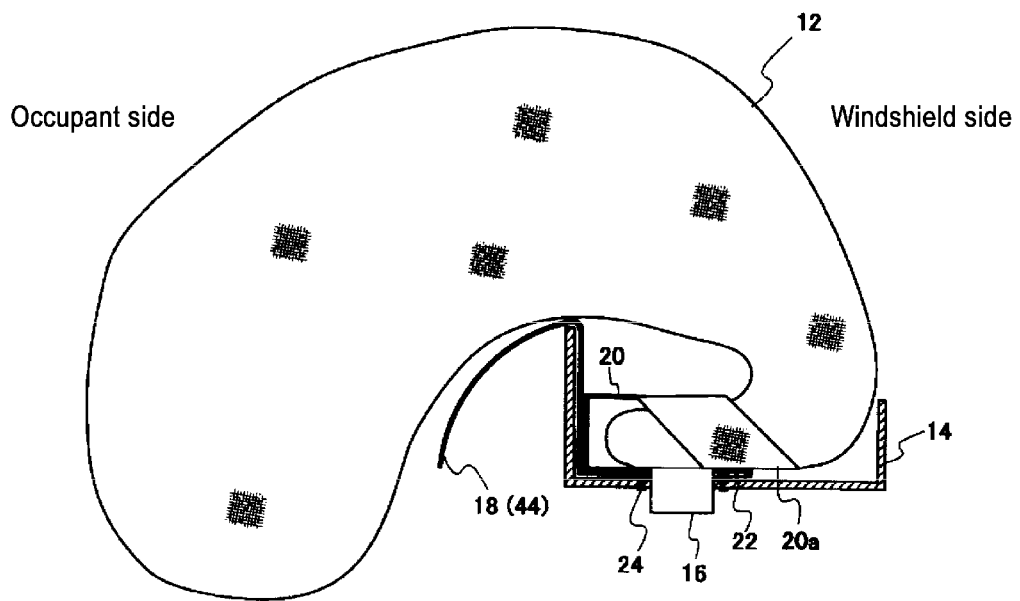
FIG. 8 is an explanatory drawing illustrating the operation of the airbag device in accordance with the present invention and showing the full-deployment state (stage 3) of the airbag.
Figure 9:
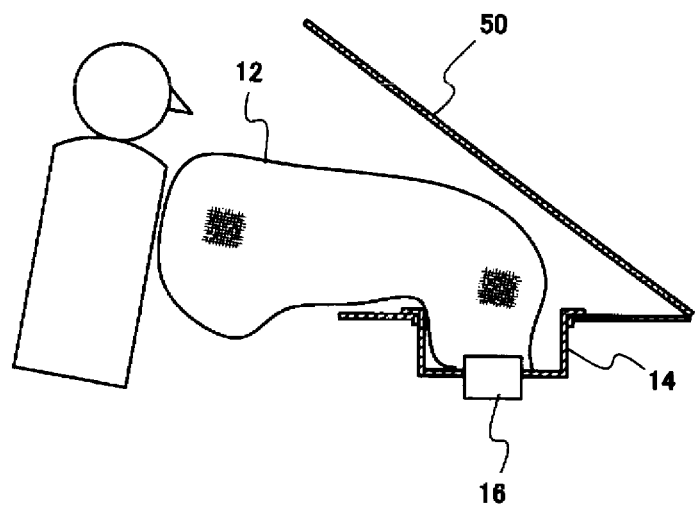
FIG. 9 is an explanatory drawing illustrating the operation of the airbag device in accordance with the present invention and showing the deployment state of the airbag at the initial stage (stage 1); this drawing clearly shows the relationship between the airbag, occupant, and windshield.
Figure 10:
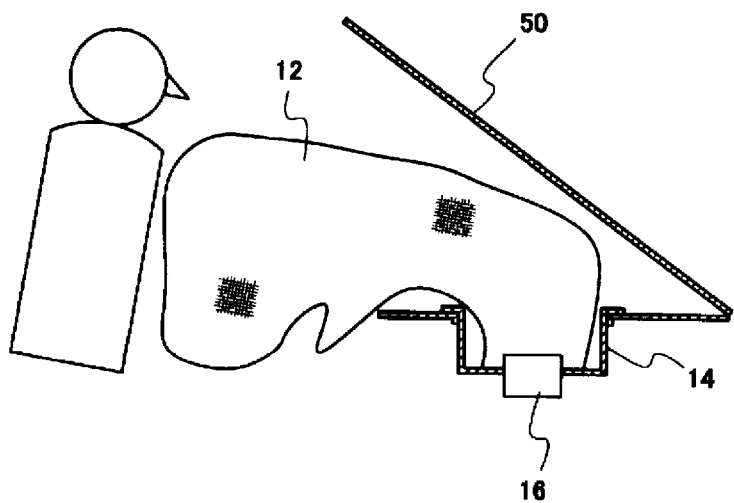
FIG. 10 is an explanatory drawing illustrating the operation of the airbag device in accordance with the present invention and showing the deployment state of the airbag at the intermediate stage (stage 2); this drawing clearly shows the relationship between the airbag, occupant, and windshield.
Figure 11:
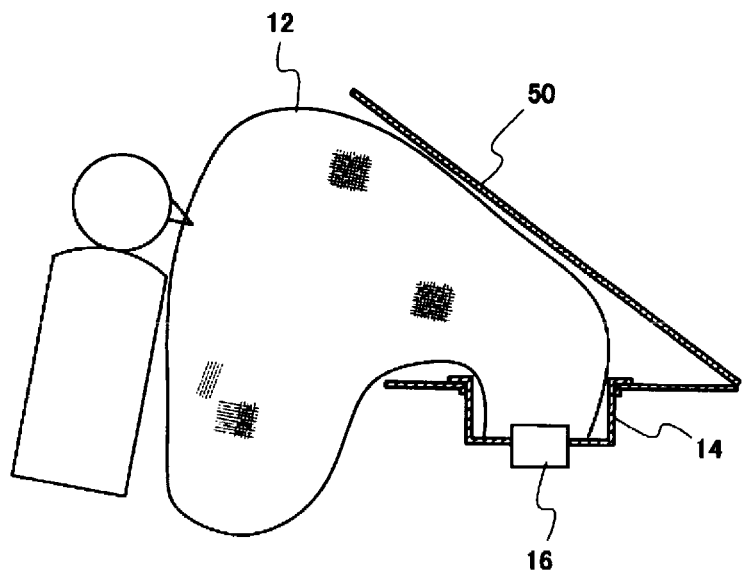
FIG. 11 is an explanatory drawing illustrating the operation of the airbag device in accordance with the present invention and showing the full-deployment state (stage 3) of the airbag; this drawing clearly shows the relationship between the airbag, occupant, and windshield.

FIG. 6 and FIG. 9 show a deployment state at the initial stage (stage 1) of the airbag 12. FIG. 7 and FIG. 10 show a deployment state at the intermediate stage (stage 2) of the airbag 12. FIG. 8 and FIG. 11 illustrate full deployment (stage 3) of the airbag 12.

When an abnormal situation such as vehicle collision occurs, the inflator 16 is actuated and inflation gas is pumped into the airbag 12. As shown in FIG. 6 and FIG. 9, at the initial actuation stage of the airbag device, the upper layer portion 12U of the airbag 12 pushes away the outer flap 18 and is deployed toward the occupant. In this case, the deployment of the lower layer portion 12L of the airbag 12 is restricted by the side surface enclosure portion 20a of the inner flap 20.

At this time, the inflation gas flows toward the central portion (see FIG. 2) of the wound upper layer portion 12U. Therefore, the airbag is deployed toward the occupant, rather than to the windshield, so that the wound configuration thereof is released, while one end thereof is being held. As a result, the airbag is prevented from being deployed over the head of a child who is abnormally close to the instrument panel or the head of an occupant of small stature, and the head is protected from a direct, strong impact.

After a certain time has passed, as shown in FIG. 7 and FIG. 10, the lower layer portion 12L of the airbag 12 begins to inflate and deploy from the windshield side. Then, as shown in FIG. 8 and FIG. 12, the entire airbag 12 is deployed and the occupant is completely restrained (protected).

The embodiments of the present invention are described above, but the present invention is not limited to these embodiments and various changes can be made without departing from the technical scope disclosed in the claims. For example, the inner flap (20a) that regulates the deployment of the lower layer portion 12L of the airbag 12 is shown having a band-like (belt-like) shape, but it can also have another shape. For example, the inner flap (20a) may be a box-like or bag-like member (made of fabric) that encloses the entire lower layer portion and where only the windshield side of the member is left open. As a result, the lower layer portion 12L of the airbag 12 may be deployed only in the direction of the windshield.

The invention claimed is:

1. An airbag device for a passenger seat that is disposed inside an instrument panel of the vehicle and protects an occupant inside the vehicle by inflation and deployment of an airbag when an emergency situation occurs, the airbag device comprising:
   an airbag having a compressed pre-deployment configuration comprising a plurality of layers formed in a vertical direction, and a deployment configuration in which the airbag is inflated and deployed when an emergency situation occurs, and
   a restriction member that restricts deployment of the airbag such that a deployment direction of an upper layer portion of the airbag is directed toward an occupant side of a vehicle, wherein the upper layer portion is the first portion among the plurality of layers of the airbag to be deployed, the lower layer portion of the airbag being deployed after the upper layer portion is deployed and being deployed out of the restriction member with the restriction member remaining intact.

2. The airbag device according to claim 1, wherein the restriction member comprises a first flap, a portion of the first flap being fixed to the vehicle, wherein the first flap encloses at least part of a lower layer portion of the airbag, the lower layer portion of the airbag being deployed after the upper layer portion is deployed.

3. The airbag device according to claim 2, wherein the first flap has a first enclosure portion that encloses the occupant side of the lower layer portion of the airbag, and a second enclosure portion that extends between the lower layer portion and the upper layer portion of the airbag in a widthwise direction of the vehicle, the second enclosure portion covering a side surface of the lower layer portion, and
   wherein a windshield side of the lower layer portion of the airbag is not covered by the first flap.

4. The airbag device according to claim 3, wherein the airbag is viewed from a side surface direction of the vehicle, the second enclosure portion of the first flap extends the obliquely downward from the occupant side toward the windshield side and covers the side surface of the lower layer portion.

5. The airbag device according to claim 1, wherein in the pre-deployment configuration, the upper layer portion has a wound roll-like shape and the lower layer portion has a folded configuration comprising a plurality of folds stacked in the vertical direction.

6. The airbag device according to claim 1, further comprising a second flap having a portion fixed to the vehicle, wherein the second flap covers at least an upper surface of the upper layer portion of the airbag in the pre-deployment configuration.

7. The airbag device according to claim 6, wherein, at an initial stage of deployment of the airbag device, the upper layer portion of the airbag engages and pushes away the second flap and the upper layer portion is freely deployed, and
   the lower layer portion of the airbag is deployed from the first flap on the windshield side of the vehicle after the upper layer portion is deployed.

8. An airbag device for a passenger seat that is disposed inside an instrument panel of the vehicle and protects an occupant inside the vehicle by inflation and deployment of an airbag when an emergency situation occurs, the airbag device comprising:
   an airbag having a compressed pre-deployment configuration comprising a plurality of layers formed in a vertical direction, and a deployment configuration in which the airbag is inflated and deployed when an emergency situation occurs,
   a restriction member that restricts deployment of the airbag such that a deployment direction of an upper layer portion of the airbag is directed toward an occupant side of a vehicle, wherein the upper layer portion is the first portion among the plurality of layers of the airbag to be deployed, the restriction member comprising a first flap, a portion of the first flap being fixed to the vehicle, wherein the first lap encloses at least part of a lower layer portion of the airbag, the lower layer portion of the airbag being deployed after the upper layer portion is deployed, the first flap having a first enclosure portion that encloses the occupant side of the lower layer portion of the airbag, and a second enclosure portion that extends between the lower layer portion and the upper layer portion of the airbag in a widthwise direction of the vehicle, the second enclosure portion covering a side surface of the lower layer portion,
   wherein a windshield side of the lower layer portion of the airbag is not covered by the first flap, and
   wherein the airbag is viewed from a side surface direction of the vehicle, the second enclosure portion of the first flap extends the obliquely downward from the occupant side toward the windshield side and covers the side surface of the lower layer portion.

9. An airbag device for a passenger seat that is disposed inside an instrument panel of the vehicle and protects an occupant inside the vehicle by inflation and deployment of an airbag when an emergency situation occurs, the airbag device comprising:

an airbag having a compressed pre-deployment configuration comprising a plurality of layers formed in a vertical direction, and a deployment configuration in which the airbag is inflated and deployed when an emergency situation occurs, and a restriction member that restricts deployment of the airbag such that a deployment direction of an upper layer portion of the airbag is directed toward an occupant side of a vehicle, wherein the upper layer portion is the first portion among the plurality of layers of the airbag to be deployed, the lower layer portion of the airbag being deployed after the upper layer portion is deployed and being deployed out of the restriction member, the restriction member extending in a first enclosure portion over an occupant side of the pre-deployment configuration of the airbag and extending in a second enclosure portion over lateral side surfaces of the pre-deployment configuration of the airbag the second enclosure portion extending from the first enclosure portion between the lower layer portion and the upper layer portion of the airbag in a widthwise direction of the vehicle and over the lateral side surfaces.

10. The airbag device according to claim 9, wherein the restriction member comprises a first flap, a portion of the first flap being fixed to the vehicle on a bottom side of the pre-deployment configuration of the airbag and extending upward forming the first enclosure portion over the occupant side of the pre-deployment configuration of the airbag.

11. The airbag device according to claim 9, wherein part of the second side portion extends obliquely downward in a direction toward the windshield side of the airbag.

12. The airbag device according to claim 9, further comprising a second flap having a portion fixed to the vehicle with the first flap, wherein the second flap covers at least an upper surface of the upper layer portion of the airbag in the pre-deployment configuration.

13. The airbag device according to claim 12, wherein the second flap has a free end on the windshield side of the vehicle.

\* \* \* \* \*